United States Patent [19]
Goetz et al.

[11] Patent Number: 5,609,932
[45] Date of Patent: Mar. 11, 1997

[54] MICROPARTICLE-CONTAINING PRESSURE SENSITIVE ADHESIVE TAPE

[75] Inventors: Richard J. Goetz, Woodbury; Daniel P. Pohl, Oakdale; Mary L. Brown, St. Paul, all of Minn.

[73] Assignee: Minnesota Mining and Manufacturing Company, St. Paul, Minn.

[21] Appl. No.: 454,953

[22] Filed: May 31, 1995

Related U.S. Application Data

[62] Division of Ser. No. 222,668, Apr. 4, 1994.

[51] Int. Cl.$^6$ ...................................................... B32B 1/08
[52] U.S. Cl. ........................ 428/36.91; 156/284; 156/294; 428/350; 428/355 AC
[58] Field of Search ........................ 428/36.9, 36.91, 428/40, 343, 350, 40.2, 41.7, 41.8, 355; 156/284, 294

[56] References Cited

U.S. PATENT DOCUMENTS

| | | | |
|---|---|---|---|
| 3,857,731 | 12/1974 | Merrill, Jr. et al. | 117/122 PA |
| 3,890,292 | 6/1975 | Bohme et al. | 260/80.76 |
| 4,077,926 | 3/1978 | Sanderson et al. | 260/29.6 |
| 4,656,218 | 4/1987 | Kinoshita | 524/460 |
| 4,735,837 | 4/1988 | Miyasaka et al. | 428/40 |
| 4,855,170 | 8/1989 | Darvell et al. | 428/40 |
| 4,994,322 | 2/1991 | Delgado et al. | 428/343 |
| 5,118,750 | 6/1992 | Silver et al. | 524/462 |
| 5,196,504 | 3/1993 | Scholz et al. | 526/318.4 |
| 5,266,402 | 11/1993 | Delgado et al. | 428/355 |
| 5,281,288 | 1/1994 | Murray et al. | 156/83 |
| 5,288,359 | 2/1994 | Stobbie, IV et al. | 156/294 |
| 5,380,779 | 1/1995 | D'Haese | 524/272 |
| 5,429,703 | 7/1995 | Hartman | 156/294 |

FOREIGN PATENT DOCUMENTS

| | | | |
|---|---|---|---|
| 0546746 | 6/1993 | European Pat. Off. | |
| 4248887 | 9/1992 | Japan | C09J 7/02 |
| WO86/03767 | 7/1986 | WIPO | C09J 7/02 |
| WO93/02855 | 2/1993 | WIPO | B32B 5/16 |
| WO93/09195 | 5/1993 | WIPO | C09J 7/02 |
| WO94/13751 | 6/1994 | WIPO | |

*Primary Examiner*—Jenna Davis
*Attorney, Agent, or Firm*—Gary L. Griswold; Walter N. Kirn; Christine O'Shaughnessy

[57] ABSTRACT

A pressure sensitive adhesive tape that employs a water-absorptive backing, a microparticle-containing pressure sensitive adhesive and a water-dispersible component is provided. A method of bonding close fitting parts is also disclosed. In the method, a microparticle-containing pressure sensitive adhesive tape (with or without the water-dispersible component in the adhesive) is employed. Articles made using the tape and/or by the method are also disclosed.

21 Claims, No Drawings

5,609,932

MICROPARTICLE-CONTAINING PRESSURE SENSITIVE ADHESIVE TAPE

This application is a division of application No. 08/222,668, filed Apr. 4, 1994, pending.

FIELD OF THE INVENTION

This invention relates to a microparticle-containing pressure sensitive adhesive tape, articles made with the tape, and a method of bonding close fitting parts together using the tape.

BACKGROUND

There are many products and constructions in which close-fitting parts must be joined together. These all involve fitting one piece partially or wholly within a second piece. Examples include joining two pieces of piping, and attaching grips to a variety of types of equipment such as fishing rods, golf clubs, motorcycles, tools, and the like.

For the attachment of grips to various types of equipment, it has been recently customary to secure a strip of pressure sensitive adhesive tape about the shaft, remove the tape's release liner to expose the adhesive, render the adhesive temporarily slippery by applying an organic solvent, such as, for example, mineral spirits or a related petroleum distillate, or trichloroethylene, and slide the grip over the adhesive. The solvent gradually evaporates to provide a strong adhesive bond between the grip and the shaft. The process is undesirable due to release of organic solvent vapors into the environment, personal exposure to liquid organic solvents, and hazards posed by flammable solvents. Alternative approaches include the use of solvent-based adhesives; two part structural adhesives; and hot melt adhesives which are applied to the shaft, followed by slipping the resilient grip over the "wet" or flowable adhesive. In yet another approach, heat moldable adhesives are employed.

One disadvantage of these methods is that adhesive is "squeezed" out when the close-fitting grip is slid onto the shaft and positioned. This is messy and time consuming to clean up. Additionally, the adhesive that is squeezed out is wasted. Furthermore, non-uniform bond lines can result, which can reduce adhesive strength. Moreover, when solvent-based adhesives are employed, there is still undesirable exposure to flammable organic liquids and organic vapors as described above. Further, when hot melt or heat moldable adhesives are employed, the use of heat is required.

Examples of hot melt adhesives for use in joining two parts together include those disclosed by Dellis in U.S. Pat. Nos. 4,785,495; and Stobbie et al. in 5,288,359. Stobbie also discloses that when an especially tight fitting joint is desired it is helpful to apply a lubricating aid, such as water or hydroxy compounds, to the interior-fitting part. A heat moldable adhesive for use in applying motorcycle hand grips is described by Dellis in U.S. Pat. No. 5,155,878.

Use of a water activated system would be desirable from the perspective that the use of heat or organic solvents could be avoided. However, typical water activated adhesives have their own disadvantages. Once a grip is slipped on, water is trapped between the two parts and long drying times, e.g., greater than 24 hours, are thus required before handling strength is reached. When water soluble adhesives are used there is an observed puddling or collection of liquid of the adhesive components when the grip is slid on. This "puddling" retards drying, and can result in inconsistent bond strength as described above.

Consequently, there exists a need for an adhesive tape that can be used to bond close fitting parts together without the need to apply and remove organic solvents or without the need to apply heat to activate the adhesive.

SUMMARY OF THE INVENTION

Briefly, in one aspect of the invention, a pressure sensitive adhesive tape is provided that comprises a water-absorptive, preferably microporous, backing having first and second opposed surfaces with a first microparticle-containing pressure sensitive adhesive on at least a portion of the first surface of the backing. The second surface may have a second pressure sensitive adhesive on at least a portion thereof. If a second pressure sensitive is employed, it may have the same or a different composition than the first microparticle-containing adhesive.

In another aspect of the invention, an article is provided that comprises an at least partially hollow first member and a second member that is received interiorly of the first member and bonded thereto by means of a pressure sensitive adhesive tape that has a microparticle-containing pressure sensitive adhesive on at least a portion of the first surface of a water-absorptive microporous backing.

In yet another aspect of the invention, a method of bonding close fitting parts is provided. The method comprises the steps of:

(a) securing a tape comprising a first microparticle-containing pressure sensitive adhesive layer and a water-absorptive, preferably microporous, backing to the second member such that the microparticle-containing adhesive layer is exposed;

(b) activating the microparticle-containing adhesive to render it slippery;

(c) positioning the first member in a manner such that the second member is at least partially received in the first member; and (d) causing the microparticle-containing adhesive to dry and adhesively secure the first and second members together.

The embodiments of the invention are particularly useful for bonding close fitting components together. For example, it is useful in bonding piping, and the placement of a handgrip on the shaft of items such as tools, bicycle or motorcycle handle bars, golf clubs and the like. By "close fitting parts" it is meant that even in the absence of the adhesive tape there would be some physical contact between the first and second members when they are assembled.

As used herein, the term "water-dispersible" means a component that can be dispersed, solvated, or swollen in water.

DETAILED DESCRIPTION

The tape of the invention comprises a water-absorptive backing, a first microparticle-containing pressure sensitive adhesive layer and, optionally, a second pressure sensitive adhesive layer. While not intending to be bound by theory, it is believed that the water-absorptive backing enables water used to activate the microparticle-containing pressure sensitive adhesive to be removed from the activated adhesive layer, thereby facilitating the drying of the adhesive and shortening the time necessary to attain a suitable level of shear holding properties.

While the microparticle-containing adhesive layer is water-activated, it is not dissolved during activation. This is because the amount of water needed for activation is not sufficient to dissolve the layer.

THE WATER-ABSORPTIVE BACKING

A wide variety of materials are useful as the backing. Although certain of these materials may not be inherently water-absorptive, it is sometimes possible to make them so by introducing porosity; applying various treatments, or including additives, modifiers, etc. or any combination thereof. Such methods are described in U.S. Pat. Nos. 4,539,256; 4,833,172; 4,861,644; 4,867,881; 4,957,943; and WO 92/07899. The backing preferably comprises a microporous matrix.

Examples of materials suitable for use as the water-absorptive backing include, but are not limited to, kraft paper (available from Monadnock Paper, Inc.); cellophane (available from Flexel Corp.); spun-bond poly(ethylene) and poly(propylene), such as Tyvek™ and Typar™ (available from DuPont, Inc.); and porous films obtained from poly(ethylene) and poly(propylene), such as Accurel™ (available from Akzona); Teslin™ (available from PPG Industries, Inc.), and Cellguard™ (available from Hoechst-Celanese).

While a variety of water-absorptive backing materials are useful in the invention, it has been found that porous films of, for example, polyolefin are preferred when there is a close tolerance between the parts to be fitted together and/or when the first member must be slid a significant distance onto the second member. An especially useful backing of this type is an ultrahigh molecular weight polyolefin.

As disclosed above, a material that is useful as the backing material is a microporous ultrahigh molecular weight polyolefin material, commercially available as "TESLIN" film. This material is flexible, stretchable, and heat and water resistant as described in U.S. Pat. No. 4,861,644. The film is a microporous matrix composed essentially of ultrahigh molecular weight, high density polyethylene having a network of interconnecting pores that communicate throughout the matrix. The density of ultrahigh molecular weight polyethylene is greater than 0.94 g/cm$^3$. The intrinsic viscosity of the ultrahigh molecular weight polyethylene is at least 18 deciliters/gram, typically 18 to 39 deciliters per gram (col. 2, lines 46–54 of U.S. Pat. No. 4,861,644). The average diameter of the pores within the matrix is in the range of from 0.02 to about 50 micrometers (col. 6, lines 54–59). The matrix can be filled with siliceous materials such as silica, mica, montmorillonite, kaolinite, asbestos, talc, sodium aluminum silicate, alumina silicate, alumina silica gels, and glass particles.

THE MICROPARTICLE-CONTAINING PRESSURE SENSITIVE ADHESIVE

The microparticle-containing pressure sensitive adhesive useful in the first pressure sensitive adhesive layer comprises a microparticle component, and preferably, a water-dispersible component. Optionally, one or more modifiers may be included in the adhesive.

The water-dispersible component suitable for use in the microparticle-containing adhesive is a material that comprises sufficient hydrophilic units to render it capable of being water-dispersible. Preferably the water-dispersible component contains functional groups, such as hydroxyl, carboxyl, amino, sulfonyl, and the like. Microparticle-containing adhesives which employ these types of water-dispersible components have been found to exhibit improved shear strength.

Examples of suitable water-dispersible components include, but are not limited to, materials selected from the group consisting of surfactants such as poly(ethylene oxide) nonylphenyl ethers such as those sold under the name IGEPAL® CO (available from Rhone-Poulenc, Inc.); poly(ethylene oxide) octylphenyl ether; poly(ethylene oxide) lauryl, cetyl, and oleyl ethers such as those sold under the name Brij® (available from ICI Americas, Inc.); poly(ethylene oxide) laurate; poly(ethylene oxide) oleate; sorbitan oleate; ethylene oxide/propylene oxide block copolymers such as those sold under the name PLURONIC® and TETRONIC® (available from BASF Corporation); metal salts (such as the sodium salt) of dodecyl benzene sulfonate, available as Siponate™ DS-10 (Rhone-Poulenc); poly(sodium styrene sulfonate); alkylaryl ether sulfates, such as sodium alkylarylether sulfate, sold under the name Triton™ (available from Rohm and Haas, Inc.); cetyl trimethyl ammonium bromide; and ammonium lauryl sulfate.

Other water-dispersible components useful in the invention include those disclosed in U.S. Pat. Nos. 2,838,421, 3,441,430, 4,442,258, 3,890,292, and 5,196,504, 4,92,501, 4,518,745, 4,482,675, 4,442,258, 4,413,080, and DE C 23 11 76. Examples of such components include but are not limited to those selected from the group consisting of poly(acrylic acid); poly(vinyl alcohol); poly(N-vinyl pyrrolidone); poly(vinyl methyl ether); poly(ethylene imine); poly(acrylamide); poly(alkoxyalkyl (meth)acrylates), such as 2-ethoxy ethyl acrylate, 2-ethoxy ethyl methacrylate, 2-(2-ethoxyethoxy) ethyl acrylate, and 2-methoxy ethyl acrylate (available from SARTOMER Company, Inc.); poly(vinyl methyl ether); poly(vinyl methyl ether:maleic anhydride), sold under the name Gantrez™ (available from International Specialty Products); poly(ether polyols), such as poly(propylene glycol) and the like, such as those sold under the name Sannix™ (available from Sanyo Chemical Industries); copolymers thereof, and the like. Copolymers of these and alkyl (meth)acrylate esters or vinyl esters are also suitable. Gums such as those derived from okra and guar may also be used.

An example of a pressure sensitive adhesive polymer that may be used as the water-dispersible component is an emulsion polymer that comprises the polymerization product of a water-dispersible poly(alkoxyalkyl) acrylate (preferably from about 50 to 98 parts by weight), and a carboxylic acid (preferably from about 50 to 2 parts by weight). Additionally, an essentially water-insoluble alkyl acrylate and a copolymerizable emulsifier monomer may be included in the polymerization components. The alkyl acrylate typically comprise from 0 to 40 parts by weight, preferably 0 parts by weight, of the polymerization mixture. The emulsifier monomer typically comprises from 0 to 6 parts by weight, preferably 0 to 4 parts by weight, of the polymerization mixture.

Examples of poly(alkoxyalkyl) acrylates useful in preparing the emulsion polymer include but are not limited to those selected from 2-(2-ethoxyethoxy) ethyl acrylate, 2-ethoxyethyl acrylate, 2-methoxyethoxyethyl acrylate, 2-methoxyethyl methacrylate, polyethylene glycol monoacrylates and methacrylates, and the like.

Examples of carboxylic acids useful in preparing the emulsion polymer include but are not limited to those selected from acrylic acid, methacrylic acid, itaconic acid, crotonic acid, maleic acid, fumaric acid, beta-carboxyethyl acrylate, and the like.

Examples of alkyl acrylates useful in preparing the emulsion polymer include but are not limited to those selected from methyl (meth)acrylate, ethyl (meth)acrylate, n-butyl (meth)acrylate, 2-methylbutyl acrylate, isoamyl acrylate, sec-butyl acrylate, isooctyl acrylate, 2-ethylhexyl acrylate, isononyl acrylate, isodecyl acrylate, and the like.

Examples of copolymerizable surfactant monomers useful in preparing the emulsion polymer include but are not limited to those which are anionic vinyl functional surfactants, such as sodium vinyl sulfonate, sodium styrene sulfonate, alkylene polyalkoxy sulfates, and the like.

Yet another pressure sensitive adhesive polymer that may be used as the water-dispersible component in the invention is described in copending application Ser. No. 08/093,080. This pressure sensitive adhesive polymer comprises a polymer of AA, BB, and CC monomers. The AA monomer is a hydrophobic monomer selected from the group consisting of an acrylic or a methacrylic ester of a non-tertiary alcohol having from 2 to 14 carbon atoms. The AA monomer comprises from 50 to 80% by weight of the AA plus BB plus CC monomers. The BB monomer is selected from β-carboxyethyl acrylate (BCEA) or a salt thereof, and mixtures of BCEA or a salt thereof, and other vinyl carboxylic acids or a salt thereof. The BB monomer comprises from about 10 to about 30% by weight of the AA plus BB plus CC monomers. If a mixture of BCEA and the vinyl carboxylic acid or its salt is used, the BCEA must comprise at least 10% by weight of the polymer. Additionally, the carboxylic acid groups of the polymer have been neutralized with an alkali metal hydroxide. The quantity of the hydroxide used to neutralize the acid groups is from about 0.5 to 2 equivalents of the hydroxide per acid group. The CC monomer is a water-dispersible macromolecular monomer which has the formula X—Y—Z. In the CC monomer, X is a moiety copolymerizable with AA and BB, Y is a divalent linking group which joins X to Z and Z is a water-dispersible group which contains at least two units which are essentially unreactive under free radical initiated copolymerization conditions which can be used to form the polymer. CC comprises from 10 to 30% by weight of the AA plus BB plus CC monomers. The X, Y, and Z monomers are described in more detail below with respect to the preparation of the microparticles.

This pressure sensitive polymer typically has an inherent viscosity (IV) at 27.5° C. in 2-butanone of from about 0.2 to over 2 dl/g. Preferably the IV is in the range from about 0.7 to 1.5 dl/g. Most preferably the IV is in the range of from about 0.9 to 1.4 dl/g.

The microparticle component useful in the adhesive of the first pressure sensitive adhesive layer is comprised of polymeric, elastomeric, solvent insoluble but solvent dispersible microparticles. These spheres may be inherently pressure sensitive if desired, although they need not be so. Additionally, they may be crosslinked if desired. They are generally spheroidal in shape, although they need not be perfectly spheroidal. They typically have an average diameter in the range of from 1 to 300 (preferably from 1 to 50) μ. The microparticles used in the invention may be solid or hollow. Hollow microparticles may contain more than one void. Typically, the hollow or void portion of the microparticles is less than 100μ in average diameter.

The microparticles may be prepared by various emulsification processes. For example the microparticles may be obtained via suspension polymerization such as the following "two-step" emulsification polymerization process comprising the steps of:

a) forming
   (i) forming a water-in-oil emulsion by mixing an aqueous solution of polar monomer(s) with oil phase monomer(s), the oil phase monomer(s) being selected from alkyl (meth)acrylate esters and vinyl esters; and
   (ii) forming a water-in-oil-in-water emulsion by dispersing the water-in-oil emulsion into an aqueous phase; and
b) initiating polymerization, preferably by application of heat or radiation.

In this process, the first step preferably involves forming a water-in-oil emulsion of an aqueous solution of monomer(s) (at least some of which is a polar monomer) in an oil phase monomer, i.e., at least one (meth)acrylate or vinyl ester monomer, with optional free radically reactive hydrophilic oligomers and/or polymers, using an emulsifier having a low hydrophilic-lipophilic balance (HLB) value. Suitable emulsifiers are those having an HLB value below about 7, preferably in the range of about 2 to about 7. Examples of such emulsifiers include sorbitan monooleate, sorbitan trioleate, and ethoxylated oleyl alcohol such as Brij™ 93, available from Atlas Chemical Industries, Inc.

In the first phase of the first step, oil phase monomer(s), emulsifier, a free radical initiator, and, optionally, free radically reactive hydrophilic oligomer and/or polymer, and, optionally, a crosslinking monomer or monomers as defined below are combined, and an aqueous solution of all or a portion of the polar monomer(s) is agitated and poured into the oil phase mixture to form a water-in-oil emulsion. The free radically reactive hydrophilic oligomer and/or polymer, may be added to either the oil phase or the water phase. A thickening agent, e.g., methyl cellulose may also be included in the aqueous phase of the water-in-oil emulsion. In the second phase of the first step, a water-in-oil-in-water emulsion is formed by dispersing the water-in-oil emulsion of the first step into an aqueous phase containing an emulsifier having an HLB value above about 6. The aqueous phase may also contain any portion of the polar monomer(s) which was not added in step one. Examples of such emulsifiers include ethoxylated sorbitan monooleate; ethoxylated lauryl alcohol; and alkyl sulfates. In both steps, when an emulsifier is utilized, its concentration should be greater than its critical micelle concentration, which is herein defined as the minimum concentration of emulsifier necessary for the formation of micelles, i.e., submicroscopic aggregations of emulsifier molecules. Critical micelle concentration is slightly different for each emulsifier, usable concentrations ranging from about $1.0 \times 10^{-4}$ to about 3.0 moles/liter. Additional detail concerning the preparation of water-in-oil-in-water emulsions, i.e., multiple emulsions, may be found in various literature references, e.g., *Surfactant Systems: Their Chemistry, Pharmacy, & Biology*, (D. Attwood and A. T. Florence, Chapman & Hall Limited, New York, 1983). If the water-in-oil-in-water emulsion is stable, then hollow or multi-void microparticles will be formed.

The second, or final process step of this method involves the application of heat or radiation to initiate polymerization of the monomers. Useful initiators are those which are normally suitable for free radical polymerization of acrylate or vinyl ester monomers and which are oil soluble and of very low solubility in water. However, when the polar monomer is N-vinyl pyrrolidone, the use of benzoyl peroxide as the initiator is recommended. Examples of such initiators include azo compounds, hydroperoxides, peroxides, and the like, and photoinitiators such as benzophenone, benzoin ethyl ether, and 2,2-dimethoxy-2-phenyl acetophenone.

Use of a water soluble polymerization initiator causes formation of substantial amounts of latex. The extremely small particle size of latex particles renders any significant formation of latex undesirable. The initiator is generally used in an amount ranging from about 0.01 percent up to about 10 percent by weight of the total polymerizable composition, preferably up to about 5 percent.

Microparticles may also be prepared by a simpler ("one-step") emulsification process comprising aqueous suspension polymerization of at least one alkyl (meth)acrylate ester monomer or vinyl ester monomer and, optionally, at least one polar monomer in the presence of at least one emulsifier which is capable of producing a water-in-oil emulsion inside the droplets, which is substantially stable during emulsification and polymerization. In this process the aqueous suspension optionally, and preferably, also includes a free radically reactive hydrophilic oligomer and/or polymer.

As in the two-step emulsification process, the emulsifier is utilized in concentrations greater than its critical micelle concentration. Examples of such emulsifiers include alkylaryl ether sulfates such as sodium alkylaryl ether sulfate, e.g., Triton™ W/30, available from Rohm and Haas; alkylaryl poly(ether) sulfates such as alkylaryl poly(ethylene oxide) sulfates, preferably those having up to about 4 ethoxy repeat units; and alkyl sulfates, such as sodium lauryl sulfate, ammonium lauryl sulfate, triethanolamine lauryl sulfate, and sodium hexadecyl sulfate; alkyl ether sulfates such as ammonium lauryl ether sulfate; and alkyl poly(ether) sulfates, such as alkyl poly(ethylene oxide) sulfates, preferably those having up to about 4 ethoxy units. Alkyl sulfates; alkyl ether sulfates; alkylaryl ether sulfates; and mixtures thereof are preferred as they provide a maximum void volume per microparticle for a minimum amount of surfactant. Nonionic emulsifiers, e.g., Siponic™ Y-500-70 (ethoxylated oleyl alcohol, available from Alcolac, Inc.); and PLURONIC® P103 (a block copolymer of poly(propylene oxide) and poly(ethylene oxide), available from BASF Corporation) can be utilized alone or in conjunction with anionic emulsifiers. Polymeric stabilizers may also be present but are not necessary.

Both the "two-step" and "one-step" methods produce an aqueous suspension of monomer droplets. Upon polymerization the droplets become microparticles. The majority of the microparticles have interior cavities that, upon drying, become voids.

Another process which may be used to prepare the microparticles forms an oil-in-water emulsion and then disperses the emulsion into an aqueous phase. The aqueous phase comprises at least one alkyl (meth)acrylate ester monomer or vinyl ester monomer, and optionally a free radically reactive hydrophilic oligomer and/or polymer. This process employs a suspension stabilizer rather than an emulsifier. As a result, this process forms monomer droplets which have no interior cavities. Upon polymerization, these droplets become solid microparticles.

Discrete polymeric microparticles may also be prepared via suspension polymerizations as disclosed in U.S. Pat. Nos. 3,691,140; 4,166,152; 4,636,432; 4,656,218; and 5,045,569 which all describe adhesive compositions.

Preparation of the microparticles of this invention may be modified by withholding the addition of all or part of the optional free radically reactive hydrophilic oligomer and/or polymer, and optionally polar monomers until after polymerization of the oil phase is initiated; however, the components must be added to the polymerizing mixture prior to 100% conversion.

The microparticles may be prepared from a number of materials. For example, alkyl acrylate and methacrylate monomers may be used to prepare the spheres. These monomers are monofunctional unsaturated acrylate and methacrylate esters of non-tertiary alkyl alcohols. The alkyl groups of these alcohols preferably contain from 4 to 14 carbon atoms. These acrylate monomers are oleophilic, water emulsifiable, have restricted water solubility, and as homopolymers, generally have glass transition temperatures below about −10° C. Examples of such monomers include but are not limited to those selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and mixtures thereof.

Preferred acrylate monomers include those selected from the group consisting of isooctyl acrylate, isononyl acrylate, isoamyl acrylate, isodecyl acrylate, 2-ethylhexyl acrylate, n-butyl acrylate, sec-butyl acrylate, and mixtures thereof.

Acrylate or methacrylate or other vinyl monomers which, as homopolymers, have glass transition temperatures higher than about −10° to 0° C., e.g., tert-butyl acrylate, isobornyl acrylate, butyl methacrylate, vinyl acetate, acrylonitrile, mixtures thereof, and the like, may optionally be utilized in conjunction with one or more of the acrylate, methacrylate and vinyl ester monomers provided that the glass transition temperature of the resultant polymer is below about −10° C.

Vinyl ester monomers suitable for use in the microparticles include but are not limited to those selected from the group consisting of vinyl 2-ethylhexanoate, vinyl caprate, vinyl laurate, vinyl pelargonate, vinyl hexanoate, vinyl propionate, vinyl decanoate, vinyl octanoate, and other monofunctional unsaturated vinyl esters of linear or branched carboxylic acids comprising 1 to 14 carbon atoms which as homopolymers have glass transition temperatures below about −10° C. Preferred vinyl ester monomers include those selected from the consisting of vinyl laurate, vinyl caprate, vinyl 2-ethylhexanoate, and mixtures thereof.

The polar monomers useful in preparing the microparticles are both somewhat oil soluble and water soluble, resulting in a distribution of the polar monomer between the aqueous and oil phases. Representative examples of suitable polar monomers include but are not limited to those selected from the group consisting of acrylic acid; methacrylic acid; itaconic acid; crotonic acid; maleic acid; fumaric acid; sulfoethyl methacrylate; and ionic monomers such as sodium methacrylate; ammonium acrylate; sodium acrylate; trimethylamine p-vinyl vinyl benzimide; N,N-dimethyl-N-(beta-methoxy-ethyl) ammonium propionate betaine; trimethylamine methacrylamide; 1,1-dimethyl-1-(2,3-dihydroxypropyl)amine methacrylamide; N-vinyl pyrrolidone; N-vinyl caprolactam; acrylamide; t-butyl acrylamide; dimethylamino ethyl acrylamide; N-octyl acrylamide; mixtures thereof, and the like. Preferred polar monomers include those selected from the group consisting of monoolefinic monocarboxylic acids; monoolefinic dicarboxylic acids; acrylamides; N-substituted acrylamides; salts thereof, and mixtures thereof. Examples of such monomers include but are not limited to those selected from the group consisting of acrylic acid; sodium acrylate; N-vinyl pyrrolidone; and mixtures thereof.

Optionally there may be included free radically reactive hydrophilic oligomers and/or polymers in the microparticles. These include but are not limited to those selected from the group consisting of poly(alkylene oxides) such as poly(ethylene oxide); poly(vinyl methyl ether); poly(acrylamide); poly(N-vinyl pyrrolidone); poly(vinyl alcohol); and mixtures thereof.

Functionalized derivatives of free radically reactive hydrophilic oligomers and polymers useful in the microparticles include those selected from the group consisting of macromers of the general formula:

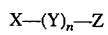

wherein
X is a group that is free radically copolymerizable with the free radically polymerizable monomer(s) and polar monomer(s);
Y is a divalent linking group;
n is an integer of 0 to 1;
Z is a monovalent hydrophilic polymeric or oligomeric moiety having a degree of polymerization greater than or equal to 2.

Examples of such macromonomers include but are not limited to those selected from the group consisting of acrylate and methacrylate functional oligomers and polymers, where X represents $H_2C=CR^1$—, where $R^1$ represents H or $CH_3$; Y is a divalent carboxyl group; n=1; and Z is a hydrophilic oligomeric or polymeric moiety having a degree of polymerization greater than or equal to 2. Such macromonomers also include but are not limited to p-styryl functional materials, X represents $H_2C=CR^1$—, where $R^1$ represents H or $CH_3$; Y represents

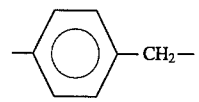

n=1; and Z is a hydrophilic oligomeric or polymeric moiety having a degree of polymerization greater than or equal to 2. Difunctional or multifunctional oligomers and polymers having more than one X group radically copolymerizable with the free radically copolymerizable monomers and polar monomers of the microparticles used in the present invention, such X groups either pendant from or terminating hydrophilic polymeric or oligomeric moiety Z, are also useful in the microparticles of the present invention.

Preferred macromonomers include those selected from the group consisting of acrylate terminated poly(ethylene oxide); methacrylate terminated poly(ethylene oxide); methoxy poly(ethylene oxide) methacrylate; butoxy poly(ethylene oxide) methacrylate; p-vinyl benzyl terminated poly(ethylene oxide); acrylate terminated poly(ethylene glycol); methacrylate terminated poly(ethylene glycol); methoxy poly(ethylene glycol) methacrylate; butoxy poly(ethylene glycol) methacrylate, p-vinyl benzyl terminated poly(ethylene glycol); poly(ethylene oxide) diacrylate; poly(ethylene oxide) dimethacrylate; and mixtures thereof. These functionalized materials are preferred because they are easily prepared through well-known ionic polymerization techniques and are also highly effective in providing grafted hydrophilic segments along free radically polymerized acrylate polymer backbones.

Preferred macromonomers also include those selected from the group consisting of p-vinyl benzyl terminated poly(N-vinyl pyrrolidone); p-vinyl benzyl terminated poly(acrylamide); methacrylate terminated poly(N-vinyl pyrrolidone); and mixtures thereof. These macromonomers may be prepared through the esterification reaction of a carboxy terminated N-vinyl pyrrolidone or acrylamide, beta-mercaptopropionic acid chain transfer agent, and chloromethyl styrene or methacryloyl chloride as described in a series of papers by M. Akashi et al. [Angew. Makromol. Chem., 132, 81 (1985); J. Appl. Polym. Sci., 39, 2027 (1990); J. Polym. Sci., Part A: Polym. Chem., 27, 3521 (1989) all incorporated by reference herein.

Preferably at least one polar monomer is included in the composition, but microparticles may also be prepared using alkyl acrylate, alkyl methacrylate and/or vinyl ester monomer(s) alone or in combination only with other vinyl free radically polymerizable monomers, e.g., vinyl acetate. However, when a methacrylate monomer alone is utilized, a crosslinking agent, infra must be included unless the hydrophilic component comprises more than one radically copolymerizable group X as defined in Formula I. Most preferably at least about 1 part to about 10 parts by weight polar monomer is included as this ratio provides microparticles with balanced PSA properties.

The composition from which the microparticles are made may also contain a multifunctional crosslinking agent. The term "multifunctional" as used herein refers to crosslinking agents which possess two or more free radically polymerizable ethylenically unsaturated groups. Useful multifunctional crosslinking agents include those selected from the group consisting of acrylic of methacrylic esters of diols such as butanediol diacrylate, triols such as glycerol, and tetrols such as pentaerythritol. Other useful crosslinking agents include those selected from the group consisting of polymeric multifunctional acrylates and methacrylates, e.g., poly(ethylene oxide) diacrylate or poly(ethylene oxide) dimethacrylate; polyvinylic crosslinking agents, such as substituted and unsubstituted divinylbenzene; and difunctional urethane acrylates, such as Ebecryl™ 270 and Ebecryl 230™ (1500 weight average molecular weight and 5000 weight average molecular weight acrylated urethanes, respectively—both available from Radcure Specialties), and mixtures thereof.

The microparticles useful in this invention are preferably comprised, based on 100 parts by weight total, of 100 parts or less of at least one free radically polymerizable monomer selected from the group consisting of alkyl acrylate esters, alkyl methacrylate esters, vinyl esters, and mixtures thereof; and optionally about 0 to about 30 parts by weight of one or more polar monomers; and optionally about 0 to about 40 parts by weight of at least one hydrophilic oligomer or polymer component.

Preferably the pressure sensitive microparticles comprise about 80 to about 98 parts of free radically polymerizable monomer selected from the group consisting of alkyl acrylate esters, alkyl methacrylate esters, vinyl esters, and mixtures thereof; and optionally about 1 to 17 parts of at least one polar monomer; and optionally about 1 to 18 parts of a hydrophilic oligomer or polymer component, based on 100 parts by weight total. Most preferably the pressure sensitive microparticles comprise about 87 to about 98 parts of free radically polymerizable monomer; and optionally about 1 to 8 parts of a polar monomer; and optionally about 1 to 5 parts of a hydrophilic oligomer or polymer component, based on 100 parts by weight total.

When a crosslinker is employed, it is typically employed at a level of up to about 10 equivalent weight percent. Above about 0.15 equivalent weight percent, of the total polymerizable microparticle composition, the microparticles become tack-free. The "equivalent weight percent" of a given compound is defined as the number of equivalents of that compound divided by the total number of equivalents in the total (microparticle) composition, wherein an equivalent is the number of grams divided by the equivalent weight. The equivalent weight is defined as the molecular weight divided by the number of polymerizable groups in the monomer (in the case of those monomers with only one polymerizable group, equivalent weight=molecular weight). The crosslinker can be added at any time before 100% conversion to polymer of the monomers of said microparticle composition. Preferably it is added before initiation occurs.

In one embodiment, the hydrophilic component may be absent from the microparticle composition. Preferably the said hydrophilic component is included in the microparticle composition. While not wishing to be bound by theory, it is believed that the pendant hydrophilic moieties, when employed, are located near to or at the surface of the microparticles. In this manner their presence contributes to the "slipperiness" of the adhesive when comes in contact with water, thus facilitating joining of the inner and outer parts. Further, the presence of the microparticle-containing adhesive is required to ensure that the adhesive does not completely dissolve, or degrade in some other way, when exposed to humid or moist conditions and result in the joined parts sliding or slipping if exposed to force after drying. The presence of microparticles with hydrophilic groups improves the slippery characteristics (when wet) of the adhesive blend. Consequently, the method of the invention does not require the presence of a water-dispersible component. However, the presence of such a component does improve slipperiness. Increasing the amount of the water-dispersible component will provide increased slipperiness at the expense of longer drying times.

The relative amounts of the above components are important to the properties of the resultant microparticle. Use of higher levels of a multifunctional crosslinker will result in tack-free microparticles. In such cases the water soluble, or dispersible, polymeric component must be tacky. In those cases where the water soluble, or dispersible, polymeric component is not itself tacky, it is necessary for the microparticle adhesive to be so.

The microparticle-containing adhesive may optionally contain one, or more, modifying agents to impart or enhance desired characteristics related to the preparation of the adhesive or to its application. Examples of useful modifying agents include, but are not limited to, thickening agents such as those selected from the group consisting of alkali swellable, associative polymers, such as those sold under the names UCAR® POLYPHOBE® (available from Union Carbide, Inc.); Alcogum™ (available from Alco Chemical); Rheolate™ (available from Rheox); Acrysol™ (available from Rohm & Haas); and Carbopol™ (available from B. F. Goodrich).

Neutralizing agents, which are often employed in combination with thickening agents or carboxylic acid functional polymers, may also be used in the present invention. Such neutralizers include, but are not limited to, those selected from the group consisting of metal ions, such as sodium, potassium, calcium, magnesium, copper, aluminum, or zinc; and amines, such as ammonia, n-hexylamine, monoethanol amine, hexamethylenediamine.

Other modifying agents which may be used to alter the properties of the adhesive blend include, but are not limited to, those selected from the group consisting of tackifying resins, plasticizers, pigments, fillers, flow control agents, and stabilizers.

The water-dispersible component used in the adhesive blend of the present invention is provided in quantity to sufficient to result in the required degree of slipperiness appropriate to the joining operation being enabled. Preferably it comprises from about 0.25 and 10%, more preferably from about 0.25 and 5% based on 100 parts total weight of the adhesive. Correspondingly, the microparticles used in the adhesive preferably are tacky and comprise about 99.75% or less, preferably from 99.75 to 95%, based on 100 parts total weight of the adhesive blend.

The second pressure sensitive adhesive layer useful in the present invention may be a microparticle-containing pressure sensitive adhesive if desired. If the second pressure sensitive adhesive contains microparticles, it may have the same or a different composition than the first adhesive layer. Alternatively, the second pressure sensitive adhesive may be some other type of adhesive (i.e., heat activated, paste, pressure sensitive, aerosol, liquid, etc.).

Examples of various materials and compositions useful as a pressure sensitive adhesive in the second adhesive layer include those discussed in the literature (e.g., Houwink and Salomon, *Adhesion and Adhesives,* Elsevier Publishing Co, Amsterdam, Netherlands, 1967; Handbook of Pressure-Sensitive Adhesive Technology, Donates Satas, Ed., Van Nostrand Reinhold Co., N.Y., 1982). These non-microparticle pressure sensitive adhesives generally comprise rubber/resin mixtures, acrylic resins, polyurethane resins, silicone resins, and the like. Among the various patent literature describing compositions and improvements in pressure sensitive adhesive formulations are U.S. Pat. Nos. RE 24,906; 2,652,351; 3,740,366; 3,299,010; 3,770,708; 3,701,758; 3,922,464; 3,931,087; 4,012,560; 4,077,926; 4,387,172; 4,418,120; 4,629,663; and the like. These classes of rubber/resin, acrylic, silicone, and polyurethane pressure sensitive adhesives as well as any other pressure sensitive adhesives are generally useful in the present invention as the second pressure sensitive adhesive layer.

Specific examples of pressure sensitive adhesives useful as the second adhesive layer include, but are not limited to, those selected from the group consisting of urethanes, block copolymer rubber, silicones, styrene block copolymers; natural rubber with a tackifier; copolymers of isooctyl acrylate/acrylic acid, isooctyl acrylate/acrylamide, isooctyl acrylate/N-vinyl pyrrolidone; and terpolymers of isooctyl acrylate/acrylic acid/polystyrene macromonomer, and isooctyl acrylate/acrylic acid/(meth)acrylate ester.

When the performance of the present invention is compared to that of a conventional water activated, repulpable adhesive, such as those disclosed in U.S. Pat. Nos. 3,865, 770; 4,413,080; or 4,442,258; or DE-C 2 311 746, on a water absorbing backing, the present invention provides improvement in terms of elimination of "puddling".

The pressure sensitive microparticle-containing adhesive sheet of the invention may be prepared in a number of ways. For example, The adhesive layers may be applied to the backing by sequential coating followed by any necessary drying and/or cooling between the individual coating steps. Alternatively, the adhesive layers may be applied simultaneously followed by any necessary drying or cooling. A number of coating techniques may be used to apply the adhesive to the backing. These include knife coating, Meyer Bar coating, curtain coating, and extrusion coating. Additionally, the adhesive composition may be sprayed onto a support if so desired.

The method of the invention will now be discussed with reference to the application of a resilient hand grip to a golf club. In this discussion, the resilient grip constitutes the first member and the shaft of the club constitutes the second member.

In the preferred embodiment of the present invention, a tape having a porous, water absorbing film and first and second pressure sensitive adhesive layers is employed. The tape is applied to the golf club shaft such that the second pressure sensitive adhesive layer holds the tape to the shaft. This may be accomplished by longitudinally applying a strip of the tape to the shaft. Alternatively, the tape may be applied around the circumference of the shaft. When this technique is used, the tape may be applied so that it does not overlap itself. Alternatively, the tape may be spirally wrapped around the shaft so that each succeeding wrap of the tape overlaps a portion of the preceding wrap of the tape. Whatever application technique is employed, the first microparticle-containing pressure sensitive adhesive layer is left exposed.

After being applied to the shaft, the exposed microparticle adhesive layer is activated by water so as to render it slippery. The water may contain a surfactant or a detergent, if desired. A number of techniques can be used to apply the water. These include dipping the wrapped shaft in the fluid, spraying the fluid onto the wrapped tape, or wiping the wrapped shaft with an applicator holding the water.

Once the microparticle-containing pressure sensitive adhesive has been rendered slippery, the resilient grip can be slid onto the shaft to its final position. The resulting assembly is then allowed to dry so as to essentially permanently bond the resilient grip to the shaft. The drying time required to reach handling strength ranges from 10 to 30 minutes. In this way the advantages of eliminating exposure to solvent, elimination of "puddling", and reduced drying times are realized. A further advantage of the present invention is that the outer part does not need to be wetted prior to the joining operation. Still another advantage provided is the ease with which the outer part may be subsequently removed from the inner part. This is accomplished by simply reversing the process, that is, water may be injected between the two parts causing the outer adhesive layer to become "slippery" once again, allowing for their separation.

Although this method has been described with regard to the placement of a resilient grip on a golf club, the method is not so limited. It is generally useful in the bonding of an at least partially open, hollow, or tubular first member, such as a sheath, sleeve, cover or grip over a second member such as a core, rod, shaft or the like, wherein the second member is received interiorly of the first member. The second member may be hollow or solid, elongated or not, and may have a circular, oval, triangular or other polygonal shape, or an asymmetrical shape in cross-section. It is also useful in bonding a grooved member, such as weather stripping, over the edge of a door or window. It may be made from metal, plastic, ceramic, glass or cellulosic material. Similarly, the first member may have a wide variety of shapes and configurations and may be formed from most any material. While it is preferred that the first member have a shape that compliments that of the second member, such is not required. By necessity, the first member must be at least partially hollow such that the second member may be received interiorly thereof, although the first member need not be circumferentially continuous.

The present invention is further illustrated in the following examples which should not be viewed as limiting in scope.

MICROPARTICLE EMULSION

MS-A 4.8 g of acrylic acid (AA), 2.4 g of poly(ethylene oxide)$_{17}$acrylate, 0.24 g of 1,6 hexanediol diacrylate and 1.13 g lucidol-70 (70% benzoyl peroxide) were dissolved in 232.4 g of iso-octylacrylate (IOA). 0.75 g of sodium dodecyl benzene sulfonate was dissolved in 360 g of water. The IOA mixture was then added to the surfactant solution, then emulsified using an Omni™ Mixer until the droplet size was less than 5μ. The emulsion was then charged to a 1-liter indented resin flask, heated to 65° C., degassed with argon and allowed to react for 8 hours. The microparticles had an average diameter of 3 microns as determined by optical microscopy.

MS-B 4.2 g of acrylic acid (AA), 4.2 g of 1,6 HDDA and 1.13 lucidol-70 (70% benzoyl peroxide) were dissolved in 230 g of iso-octylacrylate (IOA). 0.75 g of sodium dodecyl benzene sulfonate was dissolved in 360 g of water. The IOA mixture was then added to the surfactant solution, then emulsified using an Omni™ Mixer until the droplet size was less than 5μ. The emulsion was then charged to a 1-liter indented resin flask, heated to 65° C., degassed with argon and allowed to react for 12 hours. The microparticles had an average diameter of 3μ as determined by optical microscopy.

MS-C 4.8 g of acrylic acid (AA), 2.4 g of poly(ethylene oxide)$_{17}$acrylate, 0.24 g of 1,6 hexanediol diacrylate and 1.13 g lucidol-70 (70% benzoyl peroxide) were dissolved in 232.4 g of iso-octylacrylate (IOA). 0.75 g of sodium dodecyl benzene sulfonate was dissolved in 360 g of water. The IOA mixture was then added to the surfactant solution, then charged to a 1-liter indented resin flask, stirred at 400 RPM, heated to 65° C., degassed with argon and allowed to react for 8 hours. The microparticles had an average diameter of approximately 45μ as determined by optical microscopy.

MS-D

Microparticles that had an average diameter of 3 micrometers (μ) as determined by optical microscopy were prepared as follows:

4.8 g of acrylic acid (AA), 2.4 g of poly(ethylene oxide)$_{17}$acrylate, 0.24 g of 1,6 hexanediol diacrylate and 1.13 g lucidol-70 (70% benzoyl peroxide) were dissolved in 232.4 g of iso-octylacrylate (IOA). 0.75 g of sodium dodecyl benzene sulfonate was dissolved in 360 g of water. The IOA mixture was added to the surfactant solution and emulsified using an Omni™ Mixer until the droplet size was less than 5μ. The emulsion was then charged to a 1-liter indented resin flask, heated to 65° C., degassed with argon and allowed to react for 8 hours. 2.4 g of poly(acrylic acid) and 3.6 g of Polyphobe™ 104 (Union Carbide) were added to the resulting dispersion. The pH of the dispersion was adjusted to 7 with the addition of NH$_4$OH. The microparticles had an average particle size of 3μ as determined by optical microscopy.

EXAMPLE 1

The MS-A emulsion was thickened with Polyphobe™ 104 (Union Carbide 1.5% by weight of the MS-A emulsion) and then neutralized with NH$_4$OH to a pH of 7. Various additives were then added to the thickened emulsion and the resulting mixtures were coated onto separate "TESLIN" films at a wet coating thickness of 101.6μ (4 mils). The coated films were dried at 80° C. for 3 min.

The slipperiness of the film was then tested. A section of the film was secured to a table by double-coated tape to leave the microparticle adhesive surface exposed. The adhesive surface was wet with about 10 g of water and a section of a rubber golf grip was slid back and forth across the film. The slipperiness of the wetted film was subjectively rated between 0 and 5 where 0 means that the film was not slippery and 5 means that the film had excellent slipperiness. The results are listed in Table 1.

TABLE 1

| Example | Water-Dispersible Component Type | Amt. (Wgt. %) | Slipperiness Rating |
|---|---|---|---|
| 1a | Sodium dodecyl benzene sulfonate | 3 | 5 |
| 1b | Pluronic ™ F108 | 3 | 5 |
| 1c | Poly(acrylic acid) | 1 | 5 |
| 1d | Poly(vinyl alcohol) | 3 | 5 |
| 1e | Sodium dodecyl benzene sulfonate | 1 | 4 |
| 1f | Poly(sodium styrene sulfonate) | 1 | 4 |
| 1g | Ammonium lauryl sulfonate | 1 | 4 |
| 1h | Poly(N-vinyl pyrrolidone) | 1 | 3 |
| 1i | Cetyl trimethyl ammonium bromide | 1 | 3 |
| 1j | None | — | 2 |
| 1k | Poly(vinyl alcohol) | 1 | 2 |
| 1l | Poly(ethylene oxide) (MW = 400) | 1 | 1 |
| 1m | Poly(ethylene imine) | 1 | 0 |

EXAMPLE 2

The MS-A, B, and C emulsions were thickened with Polyphobe™ 104 as described in Example 1. The thickened material was then admixed with either 2% by weight poly(acrylic acid) or 3% by weight sodium dodecyl benzene sulfonate. The resulting adhesive compositions were coated onto TESLIN film, dried and tested for slipperiness as described in Example 1. The results of the tests are listed in Table 2.

TABLE 2

| Ex. | Water-Dispersible Component Type | Amt. (Wgt. %) | Microparticle | Slipperiness Rating |
|---|---|---|---|---|
| 2a | Poly(acrylic acid) | 2 | MS-A | 5 |
| 2b | Poly(acrylic acid) | 2 | MS-B | 5 |
| 2c | Sodium dodecyl benzene sulfonate | 3 | MS-B | 4 |
| 2d | Sodium dodecyl benzene sulfonate | 3 | MS-A | 4 |
| 2e | Poly(acrylic acid) | 2 | MS-C | 3 |
| 2f | Sodium dodecyl benzene sulfonate | 3 | MS-C | 2 |
| 2g | None | — | MS-B | 2 |
| 2h | None | — | MS-A | 1 |
| 2i | None | — | MS-C | 0 |

EXAMPLE 3

MS-D was coated at 152.4μ (6 mils) wet onto a 50.8μ (2 mil) polyester, then oven dried at 80° C. for 3 min. An acrylic adhesive was coated at approximately 101.6μ (4 mils) wet on the opposite side, then oven dried at 80° C. for 3 min.

5 cm (2 inch) wide strips of the tape approximately 30.5 cm (12 inches) long were applied longitudinally to the end of a golf club with the microparticle-containing pressure sensitive adhesive facing outwards. The taped end of the golf club was then submerged in water for approximately 10 seconds. After the 10 second soak, the golf club was removed and a rubber grip was applied. The resulting assembly was air dried at room temperature. Time for the tape to dry exceeded 60 minutes.

What is claimed is:

1. An article comprising an at least partially hollow first member and a second member that is received in said first member an adhesively bonded to said first member by means of a pressure sensitive adhesive tape comprising a water-absorbing backing having first and second opposed surfaces, and a first microparticle-containing pressure sensitive adhesive on at least a portion of the first surface of the backing, wherein said microparticle-containing pressure sensitive adhesive comprises:

a) from about 90 to 100 parts by weight of a microparticle-containing component; and correspondingly b) from 0 to 10 parts by weight of a water dispersible component, wherein when said adhesive comprises 100 parts by weight of said microparticle-containing component, said microparticle-containing component contains a hydrophilic moiety.

2. An article according to claim 1 wherein said first member is substantially circular in cross-section and said first member is circumferentially continuous.

3. An article according to claim 2 wherein the first member is a resilient hand grip.

4. An article according to claim 3 wherein the second member is an item of sports equipment.

5. An article according to claim 4 wherein said second member is at least a portion of the shaft of a golf club.

6. An article according to claim 1 wherein said water absorbing backing is microporous.

7. An article according to claim 6 wherein said backing has an average pore diameter of from 1 to 300μ.

8. An article according to claim 1 wherein said water-absorbing backing is selected from the group consisting of kraft paper, cellophane, film, or microporous films of polyolefin, polyester, poly(caprolactam), poly(N-vinylidene fluoride), nylon, cellulose acetate.

9. An article according to claim 6 wherein said water-absorbing backing is a microporous film of ultrahigh molecular weight polyolefin.

10. An article according to claim 9 wherein the pores of said water-absorbing backing have an average diameter in the range of from 0.2 to 50μ.

11. An article according to claim 1 wherein said first microparticle-containing pressure sensitive adhesive comprises:

a) from about 90 to 99.75 parts by weight of a microparticle-containing component; and correspondingly b) from about 10 to about 0.25 parts by weight of a water-dispersible component.

12. An article according to claim 1 wherein said first microparticle-containing pressure sensitive adhesive comprises:

a) from about 95 to 99.75 parts by weight of said microparticle-containing component; and correspondingly b) from about 5 to 0.25 parts by weight of said water-dispersible component.

13. An article according to claim 1 wherein said microparticle-containing component comprises (1) 100 parts by weight or less of at least one free radically polymerizable monomer selected from the group consisting of alkyl acrylate esters, alkyl methacrylate esters, vinyl esters and mixtures thereof;

(2) 0 to 30 parts by weight of at least one polar monomer copolymerizable with the free: radically polymerizable monomer of part (1); and (3) 0 to 40 parts by weight of at least one hydrophilic oligomer or polymer copolymerizable with either of the free radically polymerizable monomer of part (1) and the polar monomer of part (2).

14. An article according to claim 13 wherein the microparticle-containing component comprises from about 80 to 98 parts of the free radically polymerizable monomer, from about 1 to 17 parts by weight of the polar monomer and from about 1 to 18 parts by weight of the hydrophilic oligomer or polymer.

15. An article according to claim 13 wherein the hydrophilic oligomer or polymer comprises macromonomers of the general formula $$X-(Y)_n-Z$$

wherein

X is a group that is free radically copolymerizable with the free radically polymerizable monomer and optional polar monomer(s);

Y is a divalent linking group;

n is an integer of 0 to 1; and

Z is a monovalent hydrophilic polymeric or oligomeric moiety having a degree of polymerization greater than or equal to 2.

16. An article according to claim 1 wherein said water-dispersible component is a surfactant.

17. An article according to claim 16 wherein said surfactant is selected from the group consisting of poly(ethylene oxide) nonylphenyl ethers; poly(ethylene oxide) octylphenyl ether; poly(ethylene oxide) lauryl, cetyl, and oleyl ethers; poly(ethylene oxide) laurate; poly(ethylene oxide) oleate; sorbitan oleate; ethylene oxide/propylene oxide block copolymers; metal salts of dodecyl benzene sulfonate; poly(sodium styrene sulfonate); alkylaryl ether sulfates; cetyl trimethyl ammonium bromide; and ammonium lauryl sulfate.

18. An article according to claim 17 wherein said surfactant is a metal salt of dodecyl benzene sulfonate.

19. An article according to claim 18 wherein said metal salt is sodium dodecyl benzene sulfonate.

20. An article according to claim 1 wherein said water-dispersible component is a polymer selected from the group consisting of poly(acrylic acid); poly(vinyl alcohol); poly(N-vinyl pyrrolidone); poly(vinyl methyl ether); poly(ethylene imine); poly(acrylamide); poly(alkoxyalkyl (meth)acrylates); poly(vinyl methyl ether); poly(vinyl methyl ether:maleic anhydride); poly(ether polyols); copolymers thereof; and copolymers of thereof and alkyl (meth)acrylate esters or vinyl esters.

21. A method of adhesively bonding an at least partially hollow first member to a second member received interiorly of said first member, which method comprises the steps of:

(a) securing a tape comprising a water-absorbing backing having first and second surfaces and a microparticle-containing pressure sensitive adhesive on at least a portion of said first surface of said backing to the second member such that the microparticle-containing adhesive is exposed, wherein said microparticle-containing adhesive comprises (i) from about 90 to 100 parts by weight of a microparticle-containing component; and correspondingly (ii) from 0 to 10 parts by weight of a water dispersible component, wherein when said adhesive comprises 100 parts by weight of said microparticle-containing component, said microparticle-containing component contains a hydrophilic moiety;

(b) activating the microparticle-containing adhesive to render it slippery by moistening it with water;

(c) positioning the first member in a manner such that the second member is at least partially received in the first member; and (d) allowing the microparticle-containing adhesive to dry to adhesively secure the tint and second members together.

* * * * *